Feb. 23, 1932.　　　T. W. BRYANT　　　1,846,016
AUTOMATIC ACCEPTING AND REJECTING MACHINE
Filed Aug. 4, 1925　　2 Sheets-Sheet 1
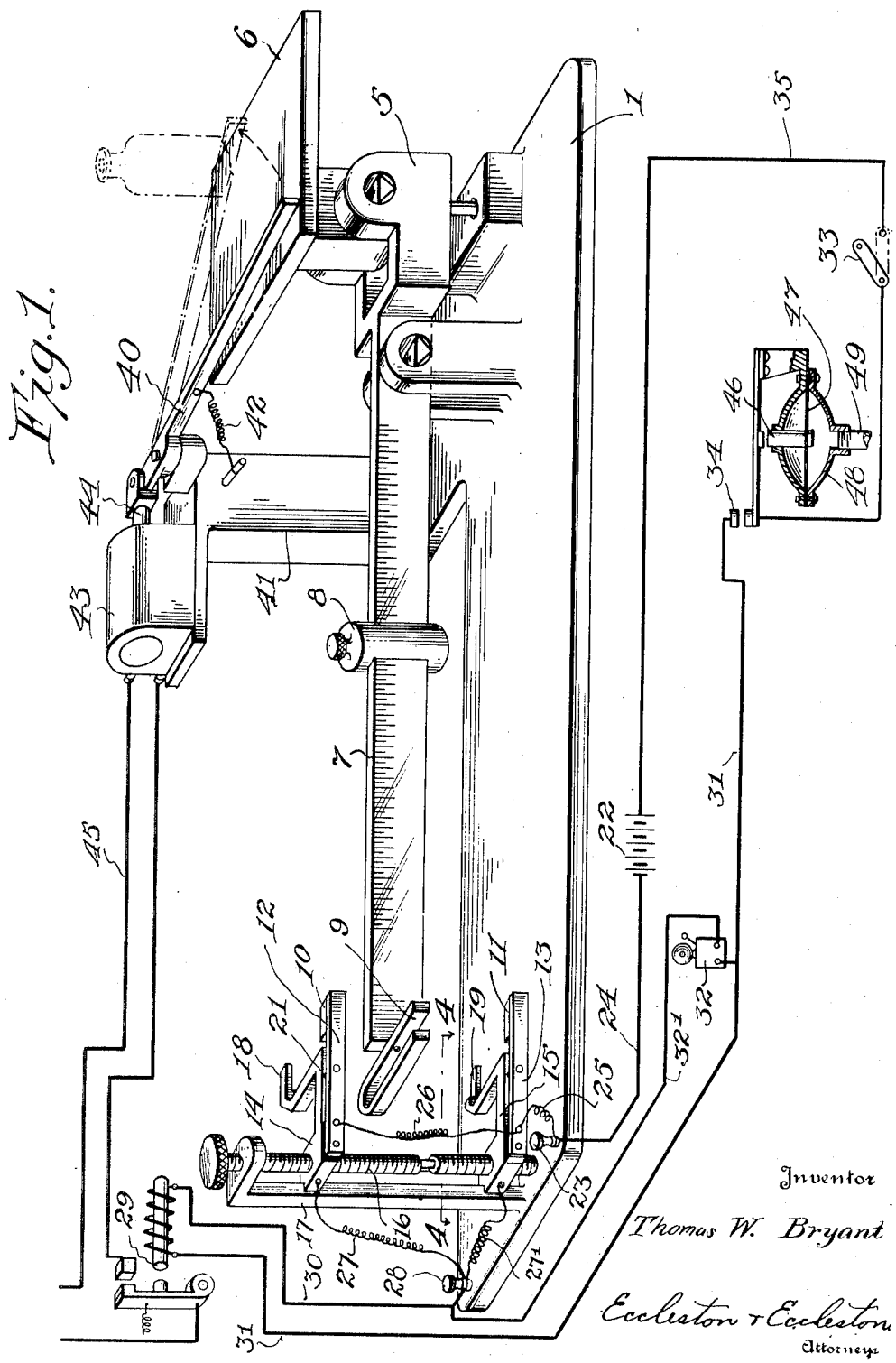
Inventor
Thomas W. Bryant
Eccleston & Eccleston
Attorneys Feb. 23, 1932.  T. W. BRYANT  1,846,016
AUTOMATIC ACCEPTING AND REJECTING MACHINE
Filed Aug. 4, 1925   2 Sheets-Sheet 2
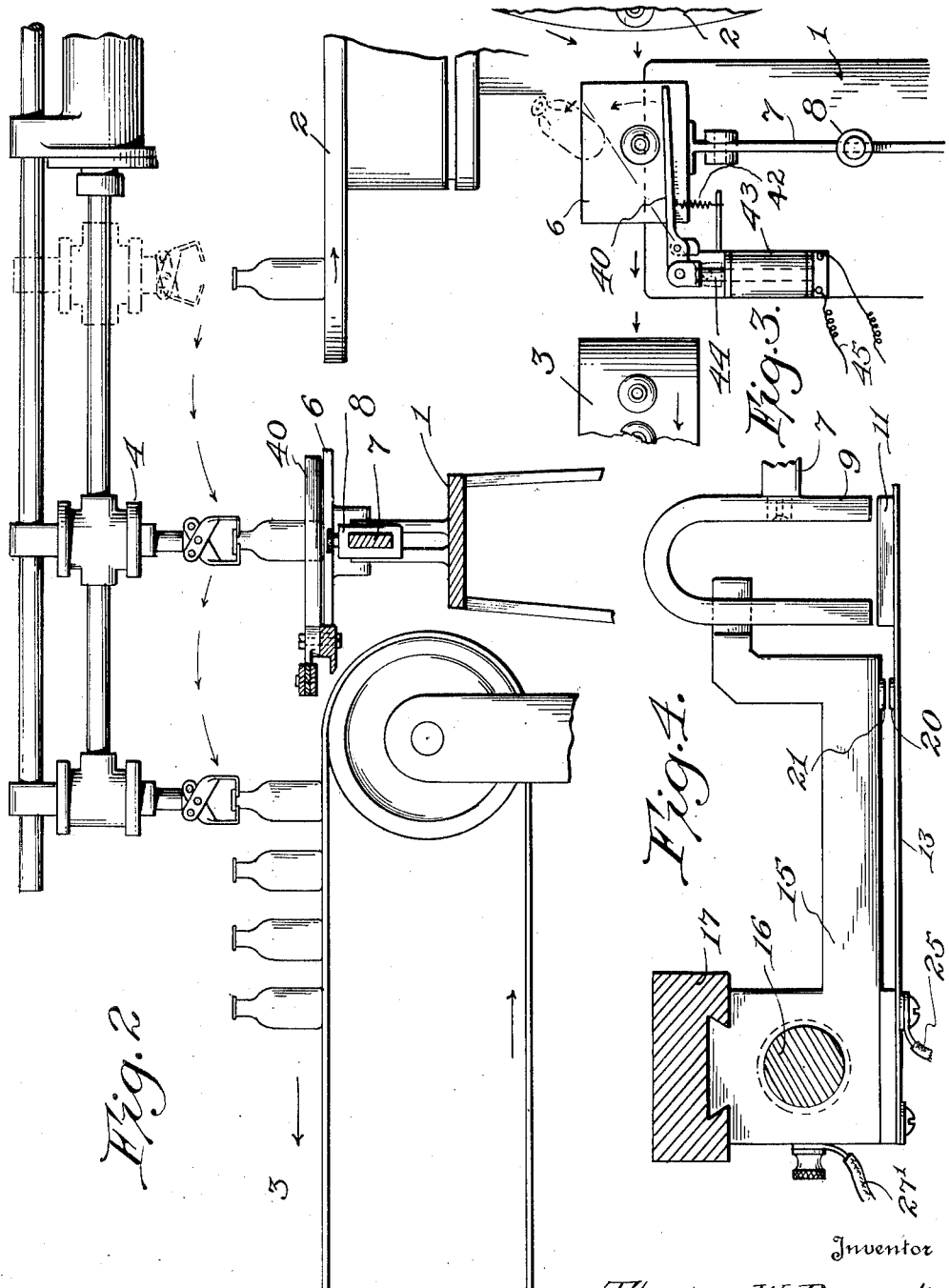
Inventor
Thomas W. Bryant
By Eccleston & Eccleston
Attorneys Patented Feb. 23, 1932

1,846,016

UNITED STATES PATENT OFFICE

THOMAS W. BRYANT, OF ZANESVILLE, OHIO, ASSIGNOR TO HAZEL-ATLAS GLASS CO., OF WHEELING, WEST VIRGINIA, A CORPORATION OF WEST VIRGINIA

AUTOMATIC ACCEPTING AND REJECTING MACHINE

Application filed August 4, 1925. Serial No. 48,153.

This invention relates to an automatic mechanism for testing the weight of bottles and other glassware formed on a bottle-making machine, and for rejecting those pieces of ware which do not conform to a predetermined standard of weight.

In the bottle-making art the requirements as to weight of the finished article are very exacting, and it has heretofore been necessary to employ a number of selectors to eliminate before packing such articles as might be above or below the standard required. It is accordingly an object of the present invention to provide a mechanism for automatically accepting or rejecting the ware placed on the device, such mechanism being controlled by the weight of the ware, and being of such sensitive construction that a minimum tolerance can be secured whereby articles of one dram or more variation are positively rejected.

A further object of the invention resides in the provision of such a mechanism which may be disposed between the forming machine and the conveyor so as to discard all bottles not coming within the prescribed standard of weight, thereby saving space in the annealing ovens.

Another object of the invention consists in the provision of an alarm which will be automatically sounded when the articles are not conforming to the predetermined weight, thus giving warning to the operator that the forming machine is not functioning properly.

Other objects and advantages of the invention will be apparent from the following description when taken in connection with the accompanying drawings, and, while the device is shown in use with bottles, it may obviously be used in connection with filling machines such as used in canneries, or in association with any other type of machines where it is essential that the articles produced be of a prescribed weight.

In the drawings:

Figure 1 is a perspective view of the apparatus.

Figure 2 is a fragmentary vertical sectional view through the apparatus, showing the same in position between the glass machine and conveyor.

Figure 3 is a plan view, parts being broken away, and

Figure 4 is an enlarged detail sectional view taken on line 4—4 of Figure 1.

Referring to the drawings more in detail, the numeral 1 indicates generally my bottle-testing apparatus, which is preferably situated between the bottle-forming machine 2 and conveyor 3, the latter, of course, transporting the articles to the annealing oven. Above the bottle-testing apparatus and associated parts is a take-off device 4, preferably operated by air, and which functions to lift the articles from the forming machine to the testing apparatus and from the testing apparatus to the conveyor. The forming machine, take-off device and conveyor form no part of the present invention, and, therefore, need be referred to only briefly in order to set forth their operative relation to the testing apparatus.

This testing apparatus consists essentially of weighing scales or balances 5, which are provided with a platform 6 on which the bottles are placed for testing, and the usual beam 7 and counterbalance 8. It will be understood, of course, that the specific type of scales shown is illustrative only and that any other preferred type may be equally well employed without in any sense departing from the spirit of the invention.

In the preferred embodiment of the invention the beam 7 carries a permanent magnet 9 on its free end which is adapted for co-operation with the soft iron bars or armatures 10 and 11 which are mounted on the insulated spring fingers 12 and 13, respectively. As will be observed from an inspection of Figures 1 and 4, these fingers are mounted on brackets 14 and 15 which are threaded to the right and left hand screw 16 and slidably mounted in the main bracket 17, the brackets 14 and 15 being provided with angular extensions 18 and 19 which form stops for limiting the movement of the magnet 9 and the beam 7 on which it is mounted. By employing the screw 16 it will be apparent that the armatures 10 and 11 may be adjusted as desired with respect to the magnet 9. Electrically connected to each spring finger 12-13 is a contact 20 for cooperation with a similar contact 21 carried by the bracket 14 or 15 forming in effect a pair of switches in the circuit which I will now describe.

This circuit includes a battery 22 one side of which is connected to a binding post 23 by wire 24. From binding post 23 the circuit is led to spring fingers 13 and 12 and to the binding post 28 by conductors 25, 26, 27 and 27'. From thence the circuit leads to a relay switch 29 and alarm 32 by wires 30 and 32' repectively, through switches 34 and 33 and conductor 35 to the other side of the battery. While a battery 22 is shown in the circuit just described, it will be obvious that the low potential required may also be supplied by employing a transformer for stepping down the voltage from a high potential circuit; furthermore, the relay switch 29 might be eliminated under certain conditions.

As heretofore stated, it is the purpose of the present invention to provide means for discarding all bottles which do not conform to a predetermined standard of weight; that is, all bottles whose weights are either above or below any fixed limits, and to this end I have provided means for quickly dislodging from the scales any such bottles. An illustrative means for accomplishing this purpose is indicated in Figure 1, wherein a kicker member 40 is pivotally mounted on the standard 41. The kicker member is positioned for oscillation across the platform 6 of the scales and is normally held in retracted position by means of coil spring 42, while ejecting movement is imparted to the kicker by means of the solenoid 43, the plunger 44 of which is pivotally connected thereto. This solenoid is in a high potential circuit 45, which also includes the relay switch 29 above referred to.

Reverting to the circuit including the battery 22 and switch 34, it should be noted that this switch is automatically operated by means of a plunger 46 attached to a diaphragm 47 inclosed in casing 48. This casing is connected by pipe 49 with the compressed air supply which also operates the take-off device, etc., and the valve mechanism is so synchronized as to close the switch 34 very shortly after a bottle is placed on the scales by the take-off mechanism, this brief interval permitting the scales to come to rest.

In the operation of the apparatus the counterbalance 8 is adjusted to the proper position on the beam 7 and switch 33 closed. As the take-off mechanism places a bottle of correct weight on the platform 6 the beam 7 and magnet 9 will assume the position shown in Figure 1. Switch 34 will be closed by the synchronized air pressure, but the switches controlled by armatures 10 and 11 will remain open; the kicker member 40, therefore, will remain in full line position (Figure 1), and on the next operation of the take-off mechnism the bottle will be removed from the scales and placed in the conveyor 3. This last operation of the take-off mechanism will, of course, place another bottle on the platform 6 and we will assume in this instance that the bottle is either above or below the prescribed weight. The switch 34 will be closed by air pressure, and the beam 7 will be either raised or lowered beyond the horizontal so that the magnet 9 will come within the range of one or the other of the armatures 10 and 11, drawing the same toward itself and closing either the upper or lower switch, thus causing the current from battery 22 to pass through the relay switch 29 and the lamp or bell 32. This action will cause the plunger 44 of solenoid 43 to be retracted, thus causing the kicker member 40 to swing across the platform 6 and remove the defective bottle so that it cannot be transported to the conveyor by the next operation of the take-off mechanism. The indicator 32 will also be operated, thereby giving warning to the workman that a bottle has been rejected, and a series of such warnings would indicate that the forming machine was not functioning properly.

From the foregoing description taken in connection with the accompanying drawings it will be seen that I have devised an exceedingly simple yet reliable mechanism by which bottles and the like may be rapidly tested as to weight and rejected if found to be defective; that the mechanism may be adjusted to a very limited tolerance; that the apparatus is so synchronized as to operate in perfect accord with a forming machine; and that the operator is notified of each defective article tested.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

Having fully described the invention, what I claim as new and desire to secure by Letters Patent is:

1. In a bottle-testing machine, scales including a platform and a beam, an electric circuit including a kicker member and a switch, a magnet carried by said beam, and an armature on said switch for cooperation with said magnet.

2. In a bottle-testing machine, scales including a platform and a beam, an electric circuit including a kicker member and a pair of vertically spaced switches, a magnet carried by said beam, and an armature on each of said switches for cooperation with said magnet.

3. In a bottle-testing machine, scales including a platform and a beam, an electric circuit including a kicker member and a pair of vertically spaced switches, a magnet carried by said beam, an armature on each of said switches for cooperation with said magnet, and means for varying the space between said switches.

4. In a bottle-testing machine, scales including a platform and a beam, an electric circuit including a kicker member and two switches, a magnet carried by said beam, an armature on one of said switches for cooperation with said magnet, and means for periodically operating the other switch.

5. In a bottle-testing machine, scales including a platform and a beam, an electric circuit including a kicker member and a plurality of switches, a magnet carried by said beam, armatures on two of said switches for cooperation with said magnet, and means for periodically operating another of said switches.

6. In a bottle-testing machine, scales including a platform and a beam, an electric circuit including a kicker member and a plurality of switches two of which are vertically spaced, a magnet carried by said beam, an armature on each of said vertically spaced switches for cooperation with said magnet, means for varying the space between said last named switches, and means for periodically operating another of said switches.

7. In a bottle-testing machine, scales including a platform, an electric circuit including a kicker member for cooperation with said platform and a relay switch, a second circuit for controlling said relay switch, a pair of vertically spaced switches in said second circuit, armatures on said last named switches, and a magnet associated with said scales for cooperation with said armatures.

8. In a bottle-testing machine, scales including a platform, an electric circuit including a kicker member for cooperation with said platform and a relay switch, a second circuit for controlling said relay switch, a pair of vertically spaced switches in said second circuit, means for varying the distance between said switches, armatures on said last named switches, and a magnet associated with said scales for cooperation with said armatures.

9. In a bottle-testing machine, scales including a platform, an electric circuit including a kicker member for cooperation with said platform and a relay switch, a second circuit for controlling said relay switch, a switch in said second circuit controlled by the position of said platform, and means for periodically rendering said second circuit inoperative.

10. In a bottle-testing machine, scales including a platform, an electric circuit including a kicker member for cooperation with said platform and a relay switch, a second circuit for controlling said relay switch, a pair of vertically spaced switches in said second circuit, means on said scales for controlling said vertically spaced switches, and means for periodically rendering said second circuit inoperative.

11. In a bottle-testing machine, scales including a platform, an electric circuit including a kicker member for cooperation with said platform and a relay switch, a second circuit for controlling said relay switch, a pair of vertically spaced switches in said second circuit, means for varying the distance between said switches, armatures on said last named switches, a magnet associated with said scales for cooperation with said armatures, and means for periodically rendering said second circuit inoperative.

12. In combination, a glass forming machine, an acceptor and rejector mechanism associated therewith, means for depositing ware on said acceptor and rejector mechanism, a motive power system for operating said forming machine and said ware depositing means, and means in said motive power system controlled by said forming machine operating means for setting the acceptor and rejector mechanism.

13. In combination, a glass forming machine, a normally inoperative acceptor and rejector mechanism associated therewith, means for depositing ware on said acceptor and rejector mechanism, a motive power system for operating said forming machine and said ware depositing means, and means in said system controlled by said forming machine operating means for rendering the acceptor and rejector mechanism operative.

14. In combination, a glass forming machine, a normally inoperative acceptor and rejector mechanism associated therewith, means for depositing ware on said acceptor and rejector mechanism, a motive power system for operating said forming machine and said ware depositing means, and means in said system controlled by said forming machine operating means and operated in timed relation with said forming machine and said ware depositing means for periodically rendering said acceptor and rejector mechanism operative.

15. In combination, a glass forming machine, an acceptor and rejector mechanism associated therewith, a take-out device for conveying ware from the forming machine to the said mechanism, a compressed air system for operating said forming machine and said take-out device, and means in said system for setting the acceptor and rejector mechanism.

16. In combination, a glass forming machine, an acceptor and rejector mechanism associated therewith, means for depositing ware on the acceptor and rejector mechanism, a compressed air system for operating said forming machine and said ware depositing means, and means in said system for periodically setting the acceptor and rejector mechanism.

17. In combination, a glass forming machine, an acceptor and rejector mechanism associated therewith, means for depositing ware on the acceptor and rejector mechanism, a compressed air system for operating said forming machine and said ware depositing means, an electrical circuit in which said acceptor and rejector mechanism is connected, a normally open switch for said circuit, and means in said compressed air system for periodically closing said switch.

THOMAS W. BRYANT.